(12) United States Patent
Ikeda et al.

(10) Patent No.: US 8,669,473 B2
(45) Date of Patent: Mar. 11, 2014

(54) DRY MICA TAPE AND INSULATION COILS MANUFACTURED THEREWITH

(75) Inventors: Kenji Ikeda, Hitachinaka (JP); Hisashi Morooka, Hitachinaka (JP); Motonobu Iizuka, Hitachi (JP); Yoshihiro Haraguchi, Hitachi (JP); Naohiro Hiruta, Takahagi (JP); Shoichi Maruyama, Yamatsuri (JP)

(73) Assignee: Hitachi, Ltd., Tokyo (JP)

( * ) Notice: Subject to any disclaimer, the term of this patent is extended or adjusted under 35 U.S.C. 154(b) by 376 days.

(21) Appl. No.: 13/205,857

(22) Filed: Aug. 9, 2011

(65) Prior Publication Data

US 2012/0038239 A1   Feb. 16, 2012

(30) Foreign Application Priority Data

Aug. 11, 2010  (JP) ................................. 2010-180223

(51) Int. Cl.
  *H01B 7/00*   (2006.01)
(52) U.S. Cl.
  USPC ... 174/110 R; 174/36; 174/120 R; 174/126.1; 174/127; 174/128.1
(58) Field of Classification Search
  USPC ....... 174/36, 110 R, 110 AR, 110 SR, 110 N, 174/110 D, 110 FC, 113 R, 117 R, 117 F, 174/117 FF, 117 A, 119 R, 119 C, 120 R, 174/120 C, 120 AR, 121 R, 121 AR, 122 R, 174/122 G, 124 R, 126.1, 126.4, 127, 128.1, 174/128.2, 129
  See application file for complete search history.

(56) References Cited

U.S. PATENT DOCUMENTS

| 3,254,150 | A | * | 5/1966  | Rogers, Jr. .................. 174/17 R |
| 3,470,045 | A | * | 9/1969  | Andreassen et al. ............ 156/53 |
| 3,556,925 | A | * | 1/1971  | Mertens ........................ 428/149 |
| 3,631,590 | A |   | 1/1972  | Wichmann et al. |
| 3,686,045 | A | * | 8/1972  | Foster ............................. 156/53 |
| 3,688,045 | A | * | 8/1972  | Ohkoshi ......................... 348/59 |
| 3,823,200 | A | * | 7/1974  | Pradennie et al. ............ 523/427 |
| 3,841,959 | A | * | 10/1974 | Mertens ........................ 442/117 |

(Continued)

FOREIGN PATENT DOCUMENTS

| CN | 101211678 | 7/2008 |
| DE | 32 18 287 | 11/1983 |

(Continued)

OTHER PUBLICATIONS

EP Search Report dated Nov. 8, 2011 in English.

*Primary Examiner* — William H Mayo, III
(74) *Attorney, Agent, or Firm* — Antonelli, Terry, Stout & Kraus, LLP.

(57) ABSTRACT

A dry mica tape includes a base material, a binder resin layer A formed on the base material and including an epoxy resin and an accelerator, a mica paper layer formed in contact with the binder resin layer A, and a binder resin layer B formed in contact with the mica paper layer, including an epoxy resin, and providing a cured resin with a higher glass transition point than that of a cured resin of an impregnating varnish only by reacting with an impregnating varnish including an epoxy resin impregnated into the dry mica tape wound around a conductor.

17 Claims, 3 Drawing Sheets

(56) References Cited

U.S. PATENT DOCUMENTS

| | | | |
|---|---|---|---|
| 3,991,232 A | | 11/1976 | Kamiuchi et al. |
| 4,113,791 A | | 9/1978 | Smith et al. |
| 4,137,275 A | | 1/1979 | Smith et al. |
| 4,224,541 A | * | 9/1980 | Smith et al. ............... 310/45 |
| 4,254,351 A | | 3/1981 | Smith et al. |
| 4,336,302 A | * | 6/1982 | Ihlein ....................... 428/324 |
| 4,356,417 A | | 10/1982 | Smith et al. |
| 4,400,676 A | | 8/1983 | Mitsui |
| 4,576,694 A | | 3/1986 | Jidai et al. |
| 4,806,806 A | * | 2/1989 | Hjortsberg et al. ......... 310/45 |
| 5,032,453 A | * | 7/1991 | Rogler et al. ............. 428/324 |
| 5,075,159 A | | 12/1991 | Koyama et al. |
| 5,158,826 A | * | 10/1992 | Ihlein et al. ............. 428/324 |
| 5,196,261 A | * | 3/1993 | Ono et al. ............... 428/310.5 |
| 5,623,174 A | * | 4/1997 | Markovitz et al. .......... 310/45 |
| 5,723,920 A | * | 3/1998 | Markovitz et al. .......... 310/45 |
| 5,733,402 A | * | 3/1998 | Sugawara et al. ......... 156/185 |
| 5,982,056 A | | 11/1999 | Koyama et al. |
| 6,043,582 A | * | 3/2000 | Markovitz et al. ......... 310/213 |
| 6,190,775 B1 | | 2/2001 | Smith et al. |
| 6,927,342 B1 | * | 8/2005 | Brandes et al. ......... 174/110 R |
| 2007/0252449 A1 | * | 11/2007 | Ikeda et al. ................. 310/45 |

FOREIGN PATENT DOCUMENTS

| | | |
|---|---|---|
| DE | 195 31 955 | 3/1997 |
| EP | 0 033 295 | 8/1981 |
| EP | 0 355 558 | 2/1990 |
| EP | 0 810 249 | 12/1997 |
| EP | 1 850 460 | 10/2007 |
| GB | 2 019 778 | 11/1979 |
| JP | 64-4615 | 1/1989 |
| JP | 3-77203 | 4/1991 |
| JP | 6-233485 | 8/1994 |
| JP | 6-233486 | 8/1994 |
| JP | 9-316167 | 12/1997 |
| WO | WO 90/00802 | 1/1990 |
| WO | WO 98/41993 | 9/1998 |

* cited by examiner

DRY MICA TAPE AND INSULATION COILS MANUFACTURED THEREWITH

CLAIM OF PRIORITY

The preset application claims priority from Japanese Patent Application serial No. 2010-180223, filed on Aug. 11, 2010, the content of which is hereby incorporated by reference into this application.

FIELD OF THE INVENTION

The present invention relates to a dry mica tape, insulation coils, a stator coil, and rotating machines.

BACKGROUND OF THE INVENTION

With regard to rotating machines for a generator, vehicle and general industrial use, miniaturization, weight reduction, and the increase of the capacity are required. As a means for miniaturization and weight reduction of the rotating machines, the increase of the current density can be cited, however, if the current density is increased, because the heat generation amount of a conductor increases when the capacity is same, high heat resistance is required for an insulating material used for a coil.

As the insulation treatment of an insulation coil and a stator coil used for a rotating machine, a single injection (impregnation) method and an integrated impregnation method are known in which a mica tape and an impregnating varnish are used.

(1) The single injection method is a method in which a dry mica tape is wound around a conductor formed into a specified shape and insulatingly sheathed to make an insulation coil unit, the impregnating varnish is injected (impregnated) in vacuum to the insulation coil unit, is thereafter further pressure-injected (impregnated), is heat-cured to make the insulation coil which is accommodated in an iron core slot and is fixed by under-insertion-piece liners, an insertion piece and the like to make a stator coil.

(2) The integrated impregnation method is a method in which a dry mica tape is wound around a conductor formed into a specified shape and insulatingly sheathed to make an insulation coil unit, which is incorporated in an iron core slot, is fixed to inside the slot by under-insertion-piece liners, an insertion piece and the like, is connected in iron core ends for integration to make a stator unit, to which the impregnating varnish is pressure-injected in vacuum, and thereafter heat-curing is performed to make a stator coil.

As described above, according to the single injection method and the integrated impregnation method, because the impregnating varnish can permeate into the entire coil such as the conductor, the void which becomes a cause lowering the electric insulation property can be reduced, and electric insulation reliability becomes high. The insulating material applied to these insulation treatment methods is constituted of the impregnating varnish with the main components of an unsaturated polyester resin and an epoxy resin, and a dry mica tape formed of base material such as a film, mica paper, a binder resin with which the mica paper and the film base material are bonded to each other, and the like.

The heat-resisting property of the coil insulating material manufactured by the injection method depends on the heat-resisting property of the cured resin of the impregnating varnish used for the insulating material. With regard to the method in which the coil insulating material manufactured using the injection method is made highly heat-resistant by making the impregnating varnish highly heat-resistant, there are methods, for example, described in Japanese Published Unexamined Patent Application Nos. H1-4615 (patent document 1) and H9-316167 (patent document 2). According to the patent document 1 and patent document 2, the impregnating varnish in which the raw material excellent in the heat-resisting property such as a multifunctional epoxy resin and a multifunctional curing agent are used is employed. However, the multifunctional epoxy resin, the multifunctional curing agent and the like are solid or highly viscous in the ordinary temperature (25° C.), and the impregnating varnish blended therewith also becomes highly viscous in the ordinary temperature. Accordingly, the injection performance of the impregnating varnish for the gap between the inductors of the coil and the fine detail of the insulating material lowers, and therefore, for example, the impregnating varnish is used after being heated and the viscosity is lowered in injecting. Also, the impregnating varnish is used for injection to the coil repeatedly for many times. Accordingly, because the curing reaction progresses gradually when the impregnating varnish is heated in every injection as described above, periodical abandonment is required. As a result, in order to make the insulating material highly heat-resistant by the impregnating varnish described in the patent document 1 and the patent document 2, the problems of lowering of the injection performance and the increase of abandonment quantity arise.

On the other hand, there are methods of manufacturing a coil achieving continuous use at 200° C. or above in which the binder resin of the dry mica tape is made highly heat-resistant, and thereby peeling-off caused by deterioration and the like of the coil insulating material manufactured by the injection method in heat-curing is prevented. They are described in, for example, Japanese Published Unexamined Patent Application Nos. H3-77203 (patent document 3), H6-233485 (patent document 4), and H6-233486 (patent document 5). In the patent document 3, a multifunctional epoxy resin including 3 or more of p-(2,3-epoxypropoxy)phenyl groups is used solely or along with a phenolic curing agent as a binder resin of the dry mica tape, in the patent document 4, an unsaturated imide-based resin composition is used as a binder resin, in the patent document 5, an epoxy resin composition having a naphthalene skeleton is used as a binder resin, and thereby the effect described above is achieved. However, according to the patent documents 3 to 5, because the binder resin of the dry mica tape is solid, it is hard to be dissolved in the injected impregnating varnish, and therefore there is a problem that the curing reaction of the binder resin and the impregnating varnish becomes non-uniform. Also, according to the patent documents 3 to 5, the base material of the dry mica tape and the mica paper (mica layer) are constituted to be bonded by one binder resin.

In the patent documents 3 to 5, there is no description that a binder resin layer A bonding a base material and mica paper has a function of solely performing curing reaction and being cured inclusion of which is clearly described in the present invention. Further, in the patent documents 3 to 5, there is no description also that a second binder resin with a composition different from that of the binder resin is arranged on the surface of mica paper and allowing curing reaction with an impregnating varnish. Accordingly, it is obvious that, in the patent documents 3 to 5, there is no description on the constitution of using two binder resins with different composition as described in the present invention, and the constitution is not disclosed in which a binder resin layer A having functions of bonding mica paper and a base material before the curing reaction and curing the mica paper and the base material after the curing reaction and a binder resin layer B present on the surface of the mica paper and having a function of dissolving in and cure-reacting with the impregnating varnish are used.

The present invention has been made to improve the heat-resisting property of a coil insulating material manufactured by an injection method using a dry mica tape and an impregnating varnish, to improve the electric insulation property of insulation coils and a stator coil at a high temperature, and to miniaturize rotating machines. Also, the impregnating varnish is surely impregnated into a dry mica tape insulation layer and the like wound around a conductor, and thereby the insulation coils, stator and rotating machines excellent in the electric property can be provided.

SUMMARY OF THE INVENTION

The present invention is to provide a dry mica tape including a base material, a binder resin layer A formed on the base material and including an epoxy resin, a mica paper layer formed in contact with the binder resin layer A, and a binder resin layer B formed in contact with the mica paper layer, including an epoxy resin, and providing a cured resin with a higher glass transition point than that of a cured resin of an impregnating varnish only by reacting with an impregnating varnish impregnated into the dry mica tape wound around a conductor. Also, the dry mica tape according to an aspect of the present invention may include an accelerator for curing reaction of an impregnating varnish impregnated into the dry mica tape wound around and a binder resin layer. Further, the present invention is to provide a stator coil obtained by winding a dry mica tape according to an aspect of the present invention around a conductor formed into a specified shape and insulatingly sheathed to make an insulation coil unit, incorporating the insulation coil unit to an iron core slot, connecting a plurality of the insulation coil units in an iron core outer end and injecting an impregnating varnish including an epoxy resin and an acid curing agent for curing in a state a plurality of the insulation coil units and an iron core are integrated. Furthermore, the present invention is to provide rotating machines using the stator coil.

A coil insulating material including a dry mica tape and an impregnating varnish according to the present invention can improve the heat-resisting property. Also, an insulating coil and a stator coil using the dry mica tape according to the present invention can improve the electric insulation property. Accordingly, rotating machines applied with the insulating coils and the stator coil according to the present invention can be miniaturized.

DETAILED DESCRIPTION OF THE PREFERRED EMBODIMENTS

Figure 1:
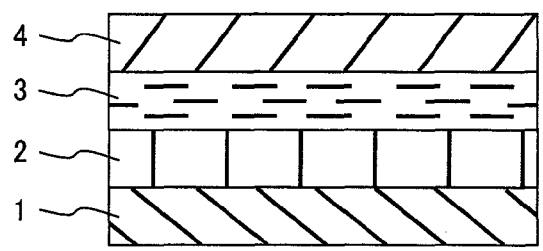
FIG. 1 is a cross-sectional view of a dry mica tape according to an aspect of the present invention.

Several examples of the preferred embodiments of the present invention will be described. In the dry mica tape, the binder resin layer B is required to include an epoxy resin reacting with an impregnating varnish impregnated into the dry mica tape wound around and providing a cured resin with a higher glass transition point than that of a cured resin of the impregnating varnish only. Those reacting with an impregnating varnish including an epoxy resin and a curing agent and suitable to form a cured resin with a higher glass transition point are an alicyclic epoxy resin, a multifunctional epoxy resin, and the like.

An accelerator of an epoxy resin can be included in the binder resin layer A and the binder resin layer B. In order to cure an epoxy resin used for an impregnating varnish, a binder resin layer A and/or a binder resin layer B and the like of a dry mica tape, an accelerator is required in general, and the accelerator is added to the impregnating varnish or the binder resin layer A and/or the binder resin layer B of the dry mica tape. From a viewpoint of the shelf life of an impregnated varnish, it is preferable that an accelerator is not added to an impregnating varnish but is contained in a constituting material of a binder resin layer A and/or a binder resin layer B and the like of a dry mica tape.

It is more preferable that an epoxy resin included in the binder resin layer A includes a multifunctional epoxy resin having three or more epoxy groups, and that an epoxy resin included in the binder resin layer B includes an alicyclic epoxy resin.

It is preferable that the binder resin layer A and/or the binder resin layer B include an epoxy resin and an accelerator. The accelerator included in the binder resin layer A and/or the binder resin layer B is more preferable to be an amine-based accelerator. Here, the amine-based accelerator is to include imidazoles. It is preferable that the accelerator included in the binder resin layer A and/or the binder resin layer B is a capsule type accelerator formed of a core of an amine compound and a shell of an epoxy resin. Here, the amine compound is to include imizodales. Also, the accelerator included in the binder resin layer A and/or the binder resin layer B may be metal acetylacetonate.

The binder resin layer A or the binder resin layer B may further include an acid curing agent having an acid anhydride skeleton expressed by a formula 1.

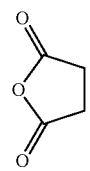

formula 1

Also, it is preferable that the acid accelerator included in the binder resin layer A is 5-(2,5-dioxotetrahydrofuryl)-3-methyl-3-cyclohexene-1,2-di carboxylic anhydride expressed by a formula 2 because the cured resin obtained can be with a higher glass transition point.

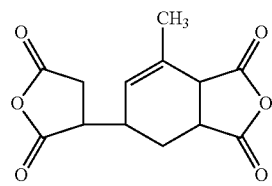

formula 2

The epoxy resin included in the binder resin layer B may include an epoxy resin having a skeleton expressed by a formula 3.

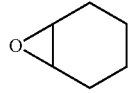

formula 3

The accelerator included in the binder resin layer B is preferable to be epoxy adduct imidazole or metal acetylacetonate.

Also, the binder resin layer B may include an acid curing agent having an acid anhydride skeleton expressed by the formula 1 in a chemical structure in addition to an epoxy resin and an accelerator.

According to an aspect of an embodiment of the present invention, there is provided an insulating coil obtained by winding a dry mica tape having a base material, a binder resin layer A formed on the base material and including an epoxy resin, a mica paper layer formed in contact with the binder resin layer A, and a binder resin layer B formed in contact with the mica paper layer, including an epoxy resin, and providing a cured resin with a higher glass transition point than that of a cured resin of an impregnating varnish only by reacting with the impregnating varnish including an epoxy resin impregnated into a dry mica tape wound around a conductor around the conductor insulatingly sheathed and formed into a specified shape to make an insulation coil unit, and injecting an impregnating varnish including an epoxy resin to the insulation coil unit for curing.

The method for manufacturing the insulation coil can be so constituted that a curing agent of an epoxy resin is included but an accelerator is not included in the impregnating varnish, and that an accelerator is included in the binder resin layer A and the binder resin layer B. The shelf life of the impregnating varnish can be extended without deteriorating the curing property of the binder resin layer A and the binder resin layer B, which contributes to reduce the cost.

According to an embodiment of the present invention, there is provided a stator coil obtained by incorporating an insulation coil unit formed by winding a drymica tape having a base material, a binder resin layer A formed on the base material, a mica paper layer formed in contact with the binder resin layer A, and a binder resin layer B formed in contact with the mica paper layer, including an epoxy resin, and providing a cured resin with a higher glass transition point than that of a cured resin of an impregnating varnish only by reacting with the impregnating varnish including an epoxy resin impregnated into a dry mica tape wound around a conductor around the conductor insulatingly sheathed and formed into a specified shape to an iron core slot, connecting a plurality of the insulation coil units in an iron core outer end and integrating the insulation coil units and an iron core to make a stator coil unit, and impregnating an impregnating varnish including an epoxy resin to the stator coil unit for curing.

The stator coil may be so constituted that the impregnating varnish includes a curing agent of an epoxy resin and the binder resin layer A and the binder resin layer B include an accelerator.

A rotating machine excellent in the heat resisting property and the electric property can be constituted of the stator coil and a rotor coil.

In the dry mica tape according to an embodiment of the present invention, a binder resin layer A, a binder resin layer B, a base material and mica paper are made a laminated structure as shown in FIG. 1. That is, because the binder resin layer A of the drymica tape according to the present invention includes an epoxy resin and an accelerator (a latent curing agent is preferable in particular), the function of bonding the base material and the mica paper before heat-curing and the function of curing the base material and the mica paper after heat-curing are provided. Also, when the composition of the binder resin layer A is made a composition including a multifunctional epoxy resin, a multifunctional acid curing agent and a latent curing agent, the effect of improving the heat-resisting property of the cured resin of the binder resin layer A after heat-curing is provided.

Also, because the binder resin layer B of the dry mica tape according to the present invention is present on the surface of the mica paper, it is easily dissolved in the impregnating varnish injected to the dry mica tape and can perform curing reaction uniformly. Further, when the composition of the binder resin layer B is made a composition including an alicyclic epoxy resin and a latent curing agent, the curing reaction hardly progresses before heat-curing to allow to extend the shelf life, and the cured resin of the impregnating varnish and the binder resin layer B has an effect of improving the heat-resisting property more than the cured resin of the impregnating varnish only does after heat-curing.

As the binder resin of the dry mica tape according to an embodiment of the present invention, it is more preferable to use a binder resin layer A of a composition including a multifunctional epoxy resin, a multifunctional acid curing agent and a latent curing agent and a binder resin B of a composition including an alicyclic epoxy resin or a mixture of an alicyclic epoxy resin and a multifunctional epoxy resin plus a latent curing agent because the effect of improving the heat resisting property of a coil insulating material including the dry mica tape and the impregnating varnish according to the present invention can be enhanced.

As described above, the dry mica tape according to an embodiment of the present invention can improve the heat resisting property of the coil insulating material manufactured by the injection method, therefore the electric insulation property of the insulation coils and the stator coil according to the present invention in a high temperature can be improved, and the rotating machines can be miniaturized.

Below, the dry mica tape, insulating coils, stator coil and rotating machines according to the present invention will be described in detail.

<Dry Mica Tape>

The cross-sectional view of the dry mica tape according to an embodiment of the present invention is shown in FIG. 1. The dry mica tape according to an embodiment of the present invention includes mica paper, a base material, a binder resin layer A, and a binder resin layer B. In the dry mica tape according to an embodiment of the present invention, the base material such as a film and the mica paper are bonded by the binder resin layer A dissolved in solvent such as methyl ethyl ketone and methyl alcohol. Also, the surface of the mica paper is coated with the binder resin layer B dissolved in the solvent such as methyl ethyl ketone and methyl alcohol is coated.

As the base material, an organic matter film, a glass cloth and the like matching the required heat-resisting property and insulating specification can be used.

As the mica paper, those made of constituted mica, flake mica and the like of an optimum grain size according to the insulation treatment method such as the single injection method and the integrated impregnating method can be used.

The binder resin layer A includes an epoxy resin and an accelerator, and a curing agent may be added according to the required property. For the epoxy resin, one kind or two kinds and more simultaneously of an epoxy resin having one or more epoxy groups can be used. For example, a bisphenol A type epoxy resin, a bisphenol F type epoxy resin, a tris-(hydroxyphenyl)methane type epoxy resin, a tris-(hydroxyphenyl)ethane type epoxy resin, a tris-(hydroxyphenyl)propane type epoxy resin, a tetrakis-(hydroxyphenyl)methane type epoxy resin, a tetrakis-(hydroxyphenyl)ethane type epoxy resin, a tetrakis-(hydroxyphenyl)propane type epoxy resin, and the like can be cited. Among these epoxy resins, the tris-(hydroxyphenyl)methane type epoxy resin having three or more epoxy groups, the 1,1,2,2-tetrakis-(hydroxyphenyl) ethane type epoxy resin and the like are more preferable because the heat-resisting property of the binder resin layer A of the dry mica tape can be improved and the heat-resisting property of the coil insulating material manufactured by the injection method can be improved.

An accelerator of the binder resin layer A is preferable to be a compound that can cure an epoxy resin. For the accelerator, one kind or two kinds and more simultaneously of, for example, metal acetylacetonate, epoxy adduct imidazole obtained by substituting an imidazole compound with an epoxy resin, metallic salt such as naphthenic acid and octylic acid, a capsule type accelerator formed of a core of an amine compound and a shell of an epoxy resin, and the like can be used. Among these accelerators, metal acetylacetonate, capsule type accelerator and the like are more preferable because the shelf life of the dry mica tape and the heat-resisting property of the coil insulating material manufactured by the injection method can be improved.

Although the binder resin layer A can be cured by a homopolymerization system of an epoxy resin and an accelerator, in order to improve curing reaction property, it is more preferable to use a curing agent in addition to the epoxy resin and the accelerator. As such a curing agent used for the binder resin layer A, one kind or two kinds or more simultaneously of an acid curing agent having one or more acid anhydride skeletons expressed by the formula 1 can be used. As the acid curing agent, for example, 5-(2,5-dioxotetrahydrofuryl)-3-methyl-3-cyclohexene-1,2-di carboxylic anhydride, ethylene glycol bisanhydrotrimellitate, glycerin bis(hydrotrimellitate) monoacetate, benzophenone tetracarboxylic dianhydride, pyromellitic anhydride, methylnadic anhydride, hydrogenated methylnadic anhydride, methyl tetra hydro phtalic anhydride, and the like can be cited. Among these acid curing agents, the 5-(2,5-dioxotetrahydrofuryl)-3-methyl-3-cyclohexene-1,2-di carboxylic anhydride as expressed by the formula 2 is more preferable because the heat-resisting property of the binder resin layer A of the dry mica tape can be improved and the heat-resisting property of the coil insulating material manufactured by the injection method can be improved.

The binder resin layer B includes an epoxy resin and an accelerator, and a curing agent may be added according to the required property. For the epoxy resin, one kind or two kinds and more simultaneously of an epoxy resin having one or more epoxy groups can be used. For example, (3',4'-epoxycyclohexene)methyl-3,4-epoxycyclohexenecarboxy late, a 1,2-epoxy-4-(2-oxiranyl)cyclohexane addition of 2,2-bis(hydroxymethyl)-1-butanol, a tris-(hydroxyphenyl)methane type epoxy resin, a tris-(hydroxyphenyl)ethane type epoxy resin, a tris-(hydroxyphenyl)propane type epoxy resin, a tetrakis-(hydroxyphenyl)methane type epoxy resin, a tetrakis-(hydroxyphenyl)ethane type epoxy resin, a tetrakis-(hydroxyphenyl)propane type epoxy resin, and the like can be cited.

Among these epoxy resins, (3',4'-epoxycyclohexene)methyl-3,4-epoxycyclohexenecarboxy late is more preferable because the solubility between the binder resin layer B and the impregnated resin is improved and the heat-resisting property of the coil insulating material manufactured by the injection method can be improved, and the shelf life and the like of the dry mica tape can be improved.

An accelerator of the binder resin layer B is preferable to be a compound that can cure an epoxy resin. For such accelerator, one kind or two kinds and more simultaneously of, for example, epoxy adduct imidazole obtained by substituting an imidazole compound with an epoxy resin, metal acetylacetonate, metallic salt such as naphthenic acid and octylic acid, a capsule type accelerator and the like can be used.

Among these accelerators, epoxy adduct imidazole, metal acetylacetonate and the like are more preferable because the heat-resisting property of the coil insulating material manufactured by the injection method and the shelf life and the like of the dry mica tape can be improved.

Also, as a curing agent for the binder resin layer B, one kind or two kinds or more simultaneously of an acid curing agent having one or more acid anhydride skeletons expressed by the formula 1 can be used. As the acid curing agent, for example, 5-(2,5-dioxotetrahydrofuryl)-3-methyl-3-cyclohexene-1,2-di carboxylic anhydride, ethylene glycol bisanhydrotrimellitate, glycerin bis(hydrotrimellitate)monoacetate, benzophenone tetracarboxylic dianhydride, pyromellitic anhydride, methylnadic anhydride, hydrogenated methylnadic anhydride, methyl tetra hydro phtalic anhydride, and the like can be cited.

<Insulation Coil>

An insulation coil is manufactured by winding a dry mica tape according to an embodiment of the present invention around a conductor formed into a specified shape and insulatingly sheathed to manufacture an insulation coil unit, and pressure-injecting an impregnating varnish to the insulation coil unit inside an injection tank and the like after injection under vacuum for curing.

<Stator Coil>

A stator coil is manufactured by winding a dry mica tape according to an embodiment of the present invention around a conductor formed into a specified shape and insulatingly sheathed to manufacture an insulation coil unit, incorporating the insulation coil unit to an iron core slot, fixing the insulation coil unit to inside the slot using under-insertion-piece liners, an insertion piece and the like, connecting the insulation coil units in iron core ends for integrating the insulation coil units and the iron core to make a stator coil unit, pressure-injecting the impregnating varnish to the stator coil unit after injecting in vacuum inside the injection tank and the like, and performing heat-curing.

<Rotating Machine Using Insulation Coil>

A rotating machine applied with the insulation coil manufactured as described above is manufactured by assembling the stator coil and a rotor, the stator coil being manufactured by incorporating the insulating coil to an iron core slot, fixing the insulation coil to inside the iron core slot by under-insertion-piece liners, an insertion piece and the like, and connecting the insulation coils in iron core ends.

<Rotating Machine Using Stator Coil>

A rotating machine is manufactured by assembling the stator coil manufactured as described above and a rotor. Below, examples of manufacturing of a dry mica tape according to an embodiment of the present invention and an insulating coil, a stator coil and a rotating machine using the dry mica tape according to an embodiment of the present invention will be described specifically referring to examples respectively.

The characteristics of the insulating material when an impregnating varnish was injected to a dry mica tape according to the present embodiment were evaluated by a measuring method and a condition described below.

(1) Heat-Resisting Property Evaluation by Dynamic Viscoelasticity Analysis (DMA: Dynamic Mechanical Analysis, Hereinafter Abbreviated as "DMA") of Insulating Material As one standard for the heat-resisting property of a cured resin of a thermosetting resin composition such as an epoxy resin, a glass transition point (hereinafter abbreviated as "Tg") can be cited. As Tg of the cured resin is higher, the electric property and the mechanical property of a coil for a rotating machine in a high temperature can be improved. Therefore, the heat-resisting property of the insulating material manufactured using the dry mica tape and the impregnating varnish according to an embodiment of the present invention was evaluated by Tg. Dynamic loss tangent (tan $\delta_{DMA}$) was measured using dynamic viscoelasticity measurement (DMA) which was one of the evaluating methods of Tg, and Tg of the insulating material was evaluated by the temperature at which tan $\delta_{DMA}$ became a peak value.

The insulating material was manufactured by that 5 layers of dry mica tapes of 30 mm width×100 mm length×0.20 mm thickness were laminated and were put between metal sheets, the impregnating varnish (an epoxy resin composition with 100 pts.wt. bisphenol A type epoxy resin jER828 (made by Japan Epoxy Resins Co., Ltd.), 100 pts.wt. methyl hexahydrophtalic anhydride curing agent HN-5500 (made by Hitachi Chemical Co., Ltd.), and 2 pts.wt. Mn [III] acetylacetonate (made by Wako Pure Chemical Industries, Ltd.) was used as an example) was injected in vacuum at 380 Pa/1 h and pressure-injected at 0.4 MPa/5 h, thereafter the temperature was raised from 25° C. to 120° C. by 30 min and was retained at 120° C./1 h, then the temperature was raised from 120° C. to 210° C. by 2 h, and was retained at 210° C./8 h. The sample for DMA was manufactured by machining the insulating material into 25 mm length×5 mm width×0.5 mm thickness size.

With respect to DMA, the temperature was raised from 25° C. to 300° C. by 2° C./min in a tensile mode, and the dynamic loss tangent (tan $\delta_{DMA}$) was measured under the condition of 20 mm span distance, 10 Hz measuring frequency, and 0.5 µm dislocation amplitude using a Rheospectoler DVE-V4 (made by Rheology, Ltd.). With respect to the determination result, when the temperature at which tan $\delta_{DMA}$ became the peak value was 170° C. or above, the mark "OK" was shown because the mechanical property and the electric insulation property of the coil and the like at a high temperature range (170° C. or above) could be improved, whereas when the temperature was below 170° C., the mark "NG" was shown, with the temperature at which tan $\delta_{DMA}$ became the peak value being shown as well in ( ).

(2) Electric Insulation Property (tan δ) Test of Insulation Coil and Stator Coil Tan δ when an insulation coil and a stator coil were left at rest inside a thermostat maintained at 180° C. and 1 kv rated voltage was applied was measured. The criterion of tan δ at 180° C. was made 15% or below because the electric insulation property was excellent in the range. With respect to the determination result, when tan δ was 15% or below, the mark "OK" was shown, whereas when tan δ exceeded 15%, the mark "NG" was shown.

The epoxy resin, curing agent and accelerator used in examples and comparative examples described below were shown by marks in Tables 1, 2, 3, and the meaning of the marks is as described below.
(a) Epoxy resin
E1: tris-(hydroxyphenyl)methane type epoxy resin
E2: bisphenol A type epoxy resin
E3: (3',4'-epoxycyclohexene)methyl-3,4-epoxycyclohexenecarboxylate
E4: 1,2-epoxy-4-(2-oxiranyl)cyclohexane addition of 2,2-bis(hydroxymethyl)-1-butanol
E5: 1,1,2,2-tetrakis-(hydroxyphenyl)ethane type epoxy resin
(Curing Agent)
C1: 5-(2,5-dioxotetrahydrofuryl)-3-methyl-3-cyclohexene-1,2-di carboxylic anhydride
C2: hydrogenated methylnadic anhydride
C3: phenolic novolak resin
C4; ethylene glycol bisanhydrotrimellitate
(c) Accelerator
CP1: capsule type accelerator (core: amine compound, shell: epoxy resin)
CP2: epoxy adduct imidazole
CP3: Mn[III] acetylacetonate Examples 1-10, Comparative Examples 1-3

The dry mica tapes of example 1-10 of the present invention were manufactured, and the heat-resisting property of the insulating material manufactured by the injection method was evaluated will be described.

The dry mica tape according to the examples 1-10 of the present invention was manufactured by using the binder resin layer A and the binder resin layer B of the compositions shown in Table 1 and Table 2, bonding the base material (polyimide film) and the mica paper by the binder resin layer A, and coating the surface of the mica paper with the binder resin layer B.

The binder resin layer A was blended by mixing, as an epoxy resin, tris-(hydroxyphenyl)methane type epoxy resin (made by Japan Epoxy Resins Co., Ltd., product name: jER1032H60), bisphenol A type epoxy resin (made by Asahi Kasei Chemicals Corporation, product name: AER-260), and 1,1,2,2-tetrakis-(hydroxyphenyl)ethane type epoxy resin (made by Japan Epoxy Resins Co., Ltd., product name: jER1031S) at the ratio of the values inside ( ). As the acid curing agent, 5-(2,5-dioxotetrahydrofuryl)-3-methyl-3-cyclohexene-1,2-di carboxylic anhydride (made by DIC Corporation, product name: EPICLON B-4400), hydrogenated methylnadic anhydride (made by New Japan Chemical Co., Ltd., product name: RIKASID HNA-100), and ethylene glycol bisanhydrotrimellitate (made by New Japan Chemical Co., Ltd., product name: TMEG-500) were mixed at the ratio of the values inside ( ) and were used. As the accelerator, a capsule type accelerator (made by Asahi Kasei E-Materials Corporation, product name: NOVACURE HX3088) and Mn [III] acetylacetonate (made by Wako Pure Chemical Industries, Ltd.) were used. The epoxy resin and the acid curing agent were mixed at an equivalent ratio of 1:1, and the accelerator was added by a concentration described in Table 1 and Table 2 with respect to the total weight of the epoxy resin and the acid curing agent.

The binder resin layer B was blended by mixing, as an epoxy resin, (3',4'-epoxycyclohexene)methyl-3,4-epoxycyclohexenecarboxy late (made by Daicel Chemical Industries, Ltd., product name: CEL2021P), 1,2-epoxy-4-(2-oxiranyl) cyclohexane addition of 2,2-bis(hydroxymethyl)-1-butanol (made by Daicel Chemical Industries, Ltd., product name:

EHPE3150), tris-(hydroxyphenyl)methane type epoxy resin, and bisphenol A type epoxy resin at the ratio of the values in ( ). As the acid curing agent, hydrogenated methylnadic anhydride was used. As the accelerator, epoxy adduct imidazole (made by Japan Epoxy Resins Co., Ltd., product name: P200) and Mn [III] acetylacetonate were used. The coating amount of the accelerator was made 1-1.2 g/m² with respect to the mica tape, and the accelerator was used adding to an epoxy resin solely or to the mixture of the epoxy resin and the acid curing agent mixed at an equivalent ratio of 1:1. Also, the accelerator can be prepared separately without adding to the epoxy resin solely or to the mixture of the epoxy resin and the acid curing agent of the binder resin layer B, and the surface of the mica paper can be coated with the accelerator before or after the binder resin layer B is coated.

The dry mica tape according to the comparative examples 1-2 was manufactured by bonding the mica paper and the base material (polyimide film) using the binder resin layer A with the composition shown in Table 3, and coating the surface of the mica paper with epoxy adduct imidazole by 1 g/m² as the accelerator. The binder resin layer A was blended by mixing 1,1,2,2-tetrakis-(hydroxyphenyl)ethane type epoxy resin and bisphenol A type epoxy resin at the ratio of the values in ( ) as the epoxy resin.

The dry mica tape according to the comparative example 3 was manufactured by bonding the mica paper and the base material (polyimide film) using the binder resin layer A with the composition shown in Table 3, and coating the surface of the mica paper with epoxy adduct imidazole by 1 g/m² as the accelerator.

The binder resin layer A was blended by mixing 1,1,2,2-tetrakis-(hydroxyphenyl)ethane type epoxy resin and bisphenol A type epoxy resin at the ratio of the values in ( ) as the epoxy resin and mixing the epoxy resin and the curing agent at the equivalent ratio of 1:1 using phenolic novolak type curing agent (made by Meiwa Plastic Industries, Ltd., product name: MF-1M) as the accelerator.

The size of the dry mica tapes of the examples and the comparative examples of this invention manufactured was made 30 mm width×20 m length. The heat-resisting property of the coil insulating material manufactured by the injection method using the dry mica tapes of the examples and the comparative examples of this invention was shown in Tables 1-3.

All of the heat-resisting property of the insulating material of the examples 1-10 were 170° C. or above. On the other hand, all of the heat-resisting property of the dry mica tapes of the comparative examples 1-3 were below 170° C., and the criterion value was not satisfied. Although the binder resin capable of enhancing the heat-resisting property such as a multifunctional epoxy resin was used for the dry mica tapes of the comparative examples, the solid binder resin was merely present between the base material and the mica paper, therefore the impregnating varnish did not penetrate enough, the solubility between them was inferior, and the heat-resisting property did not improve.

The dry mica tapes of the present examples had an effect capable of making the heat-resisting property (determined by dynamic viscoelasticity using the temperature at which tan $\delta_{DMA}$ became the peak value) of the coil insulating material manufactured by the injection method 170° C. or above because the binder resin layer A, the binder resin layer B, the base material and the mica paper were in a laminated structure.

TABLE 1

|  |  | Example 1 | Example 2 | Example 3 | Example 4 | Example 5 |
|---|---|---|---|---|---|---|
| Binder resin layer A | Epoxy resin amount (compounding ratio) | E1(100) | E1(50):E2(50) | E1(50):E2(50) | E1(50):E2(50) | E1(100) |
|  | Curing agent (compounding ratio) | C1(100) | C1(50):C2(50) | C1(50):C2(50) | C1(50):C2(50) | C1(50):C2(50) |
|  | Concentration of accelerator to total weight of epoxy resin and curing agent (wt %) | CP1(6) | CP1(10) | CP3(3) | CP1(3) | CP1(8) |
|  | Weight ratio of binder resin layer A to total weight of dry mica tape (wt %) | 8 | 8 | 9 | 9 | 8 |
| Binder resin layer B | Epoxy resin amount (compounding ratio) | E3(100) | E3(80):E4(20) | E3(80):E2(20) | E1(60):E2(40) | E1(50):E2(50) |
|  | Curing agent (compounding ratio) | — | — | — | C1(30):C2(70) | — |
|  | Coating amount of accelerator to dry mica tape (g/m²) | CP2(1) | CP2(1) | CP2(1.2) | CP3(1.2) | CP3(1) |
|  | Weight ratio of binder resin layer B to total weight of dry mica tape (wt %) | 5 | 4.5 | 6 | 5 | 4.5 |
| Cured resin property | Heat-resisting property*1 (° C.) | 191 | 190 | 188 | 180 | 175 |
|  | Determination | OK | OK | OK | OK | OK |

*1 Temperature of peak tan $\delta$DMA by dynamic viscoelasticity test

TABLE 2

|  |  | Example 6 | Example 7 | Example 8 | Example 9 | Example 10 |
|---|---|---|---|---|---|---|
| Binder resin layer A | Epoxy resin amount (compounding ratio) | E5(100) | E5(50):E2(50) | E5(50):E2(50) | E5(50):E2(50) | E1(60):E2(40) |
|  | Curing agent (compounding ratio) | — | C4(50):C2(50) | C1(50):C2(50) | C1(50):C2(50) | — |
|  | Concentration of accelerator to total weight of epoxy resin and curing agent (wt %) | CP1(6) | CP1(8) | CP3(4) | CP1(10) | CP3(4) |
|  | Weight ratio of binder resin layer A to total weight of dry mica tape (wt %) | 8 | 8 | 9 | 9 | 8 |

TABLE 2-continued

|  |  | Example 6 | Example 7 | Example 8 | Example 9 | Example 10 |
|---|---|---|---|---|---|---|
| Binder resin layer B | Epoxy resin amount (compounding ratio) | E3(100) | E3(80):E4(20) | E3(90):E2(10) | E1(70):E2(30) | E1(50):E2(50) |
|  | Curing agent (compounding ratio) | — | — | — | C2(100) | — |
|  | Coating amount of accelerator to dry mica tape (g/m$^2$) | CP2(1.2) | CP2(1.2) | CP2(1) | CP3(1) | CP3(1) |
|  | Weight ratio of binder resin layer B to total weight of dry mica tape (wt %) | 5 | 5 | 6 | 5 | 4.5 |
| Cured resin property | Heat-resisting property*1 (° C.) | 180 | 184 | 186 | 179 | 175 |
|  | Determination | OK | OK | OK | OK | OK |

*1 Temperature of peak tan δ DMA by dynamic viscoelasticity test

TABLE 3

|  |  | Comparative example 1 | Comparative example 2 | Comparative example 3 |
|---|---|---|---|---|
| Binder resin | Epoxy resin (compounding ratio) | E2(100) | E5(50):E2(50) | E5(50):E2(50) |
|  | Curing agent (compounding ratio) | None | None | C3(100) |
|  | Weight ratio of binder resin to total weight of dry mica tape (wt %) | 8 | 8 | 9 |
| Coating amount of accelerator to dry mica tape (g/m$^2$) |  | CP2(1) | CP2(1) | CP2(1) |
| Cured resin property | Heat-resisting property*1 (° C.) | 151 | 155 | 156 |
|  | Determination | NG | NG | NG |

*1 Temperature of peak tan δ DMA by dynamic viscoelasticity test

Examples 11-13, Comparative Examples 4-5

Figure 2A:
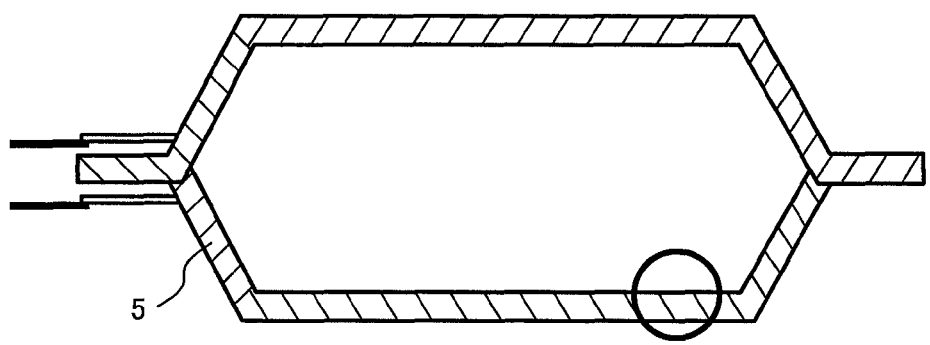
FIG. 2A is an outside view of an insulation coil according to an aspect of the present invention.
Figure 2B:
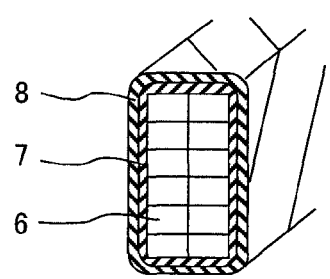
FIG. 2B is a cross-sectional enlarged view of the inside of a part shown by a circle in FIG. 2A.

The manufacturing method of the insulating coils using the dry mica tape according to an embodiment of the present invention and the property of the insulating coils obtained will be described. FIG. 2A is an outside view of an insulation coil 5 of the present examples 11-13, and FIG. 2B is a cross-sectional enlarged view of the inside of a part shown by a circle in FIG. 2A.

With respect to the insulation coil of the example 11, the insulation coil unit was manufactured by winding a dry mica tape (0.15 mm thickness×25 mm width) of the example 2 by 5 turns around the conductor formed into a specified shape and insulatingly sheathed. The insulation coil unit was left at rest in an impregnation tank maintained at 25° C., the impregnating varnish (the impregnating varnish with 100 pts.wt. of jER828, 100 pts.wt. of HN-5500, and 2 pts.wt. of Mn [III] acetylacetonate was used as an example) was injected in vacuum at 380 Pa/1 h and pressure-injected at 0.4 MPa/5 h, thereafter heat-curing (the temperature was raised from 25° C. to 120° C. by 30 min and was retained at 120° C./1 h, then the temperature was raised from 120° C. to 210° C. 2 h, and was retained at 210° C./8 h) was performed, and the insulation coil of the example 11 was manufactured. The insulation coil unit of the example 12 was manufactured by a method similar to that of the example 11 with the only exception that the dry mica tape of the example 4 was used, the impregnating varnish was injected to the insulation coil unit by a method similar to that of the example 11, and the insulation coil of the example 12 was manufactured. The insulation coil unit of the example 13 was manufactured by a method similar to that of the example 11 with the exception that the dry mica tape of the example 6 was used and the final curing temperature was changed to 230° C., the impregnating varnish was injected to the insulation coil unit by a method similar to that of the example 11, and the insulation coil of the example 13 was manufactured.

On the other hand, the insulation coil unit of the comparative example 4 was manufactured by a method similar to that of the example 11 with the only exception that the dry mica tape of the constitution of the comparative example 1 was used, the impregnating varnish was injected to the insulation coil unit by a method similar to that of the example 11, and the insulation coil of the comparative example 4 was manufactured. The insulation coil unit of the comparative example 5 was manufactured by a method similar to that of the example 11 with the only exception that the dry mica tape of the constitution of the comparative example 3 was used, the impregnating varnish was injected to the insulation coil unit by a method similar to that of the example 11, and the insulation coil of the comparative example 5 was manufactured.

Tan δ (applied voltage: 1 kv) at 180° C. of the insulation coil units of the examples 11-13 and the comparative examples 4-5 was measured. The result is shown in Table 4. Tan δ of the insulation coil units of the examples 11-13 was in the range of 13.2-14.1%. On the other hand, the insulation coil of the comparative examples 4-5 used the dry mica tape of the comparative examples 1, 3, therefore the heat-resisting property became inferior, and tan δ was 24.2%, 22.3% respectively.

According to the present examples 11-13, the insulating coils excellent in the electric insulation property were obtained because a dry mica tape capable of improving the heat-resisting property of the insulating material was used.

TABLE 4

|  | Example 11 | Example 12 | Example 13 | Comparative example 4 | Comparative example 5 |
|---|---|---|---|---|---|
| Dry mica tape used | Example 2 | Example 4 | Example 6 | Comparative example 1 | Comparative example 3 |
| tanδ (%) | 13.2 | 14.1 | 14.1 | 24.2 | 22.3 |

Examples 14-16

Figure 3A:
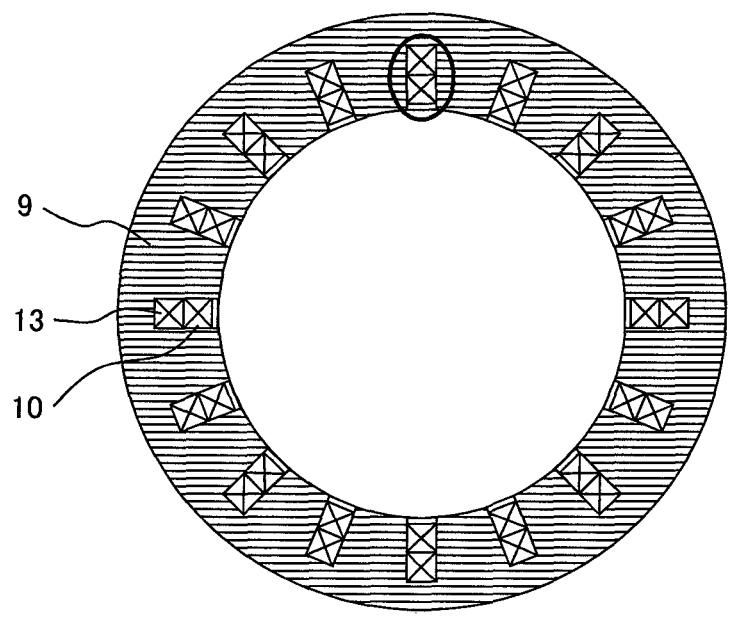
FIG. 3A is a cross-sectional front view of a stator coil according to an aspect of the present invention.

The example in which a stator coil was manufactured using the dry mica tape shown in an embodiment of the present invention will be described. FIG. 3A is a cross-sectional front view of a stator coil according to an embodiment of the present invention, and FIG. 3B is a cross-sectional enlarged view of an iron core slot (after the insulation coil unit was inserted) according to an embodiment of the present invention of a part shown by an ellipse in FIG. 3A.

Figure 3B:
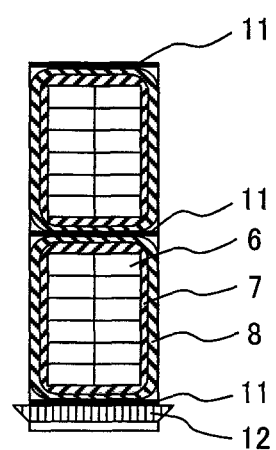
FIG. 3B is a cross-sectional enlarged view of an iron core slot of a part shown by an eclipse in FIG. 3A.

With respect to the stator coil of the example 14, the insulation coil unit was manufactured by a method similar to that of the example 7 using the dry mica tape of the example 1, the insulation coil unit was inserted to the iron core slot 10 of the iron core 9, thereafter the under-insertion-piece liners 11 and the insertion piece 12 shown in FIG. 3B were inserted respectively for fixing the insulation coil unit, and the stator coil unit was manufactured. The stator coil unit was left at rest in an impregnation tank maintained at 25° C., and the stator coil of the example 14 was manufactured using the impregnating varnish similar to that of the example 11 under the injecting condition and the heat-curing condition similar to those of the example 11. Next, the stator coil of the example 15 was manufactured by a method similar to that of the example 11 with the only exception that the dry mica tape of the example 3 was used. Further, the stator coil according to the example 16 was manufactured by the method similar to that according to the example 11 with the only exception that the dry mica tape according to the example 5 was used.

Tan δ (applied voltage: 1 kv) at 180° C. of the stator coil of the examples 14-16 was measured. The result was shown in Table 5. In the stator coil of the examples 14-16, tan δ was 12.2-14.0%.

According to the examples 14-16, the stator coil excellent in the electric insulation property was obtained because a dry mica tape capable of improving the heat-resisting property of the insulating material was used.

TABLE 5

|  | Example 14 | Example 15 | Example 16 |
|---|---|---|---|
| Dry mica tape used | Example 1 | Example 3 | Example 5 |
| tanδ (%) | 12.2 | 12.6 | 14.0 |

Example 17

Figure 4:
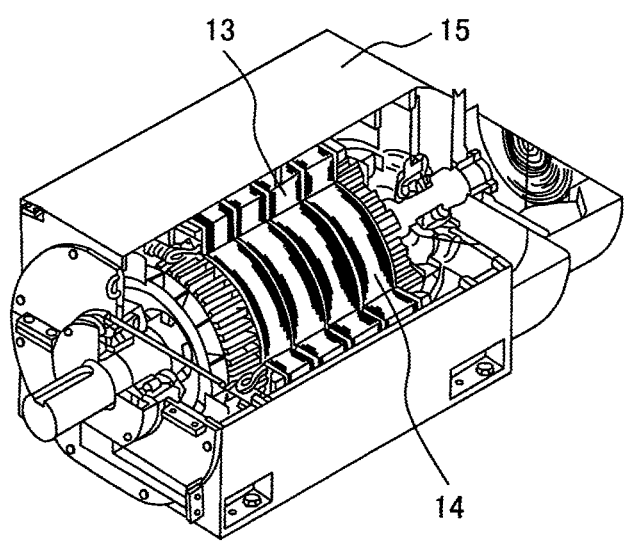
FIG. 4 is a perspective cross-sectional view of a rotating machine using a stator coil according to an aspect of the present invention.

An example in which the stator coil manufactured using the dry mica tape shown in the present invention was applied to a rotating machine according to an embodiment of the present invention will be described. With respect to the rotating machine of the example 17, the rotating machine 15 was manufactured by assembling and connecting wires of the stator coil 13, the rotor coil 14 and the like as shown in FIG. 4 using the stator coil manufactured by a method similar to that of the example 14.

Because the rotating machine of the example 17 used the stator coil capable of improving the electric insulation property at a high temperature (180° C.), the output could be increased without changing the size of the stator coil, and therefore the effect of miniaturizing the rotating machine according to the present invention was obtained.

What is claimed is:

1. A dry mica tape comprising:
   a base material;
   a binder resin layer A formed on the base material and including an epoxy resin and an accelerator;
   a mica paper layer formed in contact with the binder resin layer A; and
   a binder resin layer B formed in contact with the mica paper layer, including an epoxy resin, and providing a cured resin with a higher glass transition point than that of a cured resin of an impregnating varnish only by reacting with an impregnating varnish including an epoxy resin impregnated into the dry mica tape wound around a conductor.

2. The dry mica tape according to claim 1, wherein the binder resin layer B includes an accelerator of an epoxy resin.

3. The dry mica tape according to claim 2,
   wherein the epoxy resin included in the binder resin layer A includes a multifunctional epoxy resin having 3 or more epoxy groups, and
   wherein the binder resin layer B includes an alicyclic epoxy resin.

4. The dry mica tape according to claim 3, wherein the accelerator included in the binder resin layer A and/or the binder resin layer B is metal acetylacetonate.

5. The dry mica tape according to claim 2, wherein the epoxy resin included in the binder resin layer B includes an epoxy resin having a skeleton expressed by a formula 3:

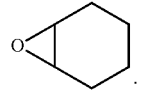

formula 3

6. The dry mica tape according to claim 2, wherein the accelerator included in the binder resin layer B includes epoxy adduct imidazole or metal acetylacetonate.

7. The dry mica tape according to claim 2, wherein the binder resin layer B includes an acid curing agent having an acid anhydride skeleton expressed by the formula 1 in a chemical structure in addition to the epoxy resin and the accelerator.

8. The dry mica tape according claim 1, wherein the binder resin layer A and/or the binder resin layer B include an epoxy resin and an amine-based accelerator.

9. The dry mica tape according to claim 8, wherein in the amine-based accelerator included in the binder resin layer A and/or the binder resin layer B, a core is an amine compound and a shell is a capsule type accelerator composed of an epoxy resin.

10. The dry mica tape according to claim 8, wherein the binder resin layer A or the binder resin layer B further includes an acid curing agent having an acid anhydride skeleton expressed by a formula 1:

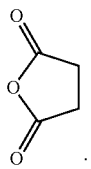

formula 1

11. The dry mica tape according to claim 10, wherein the acid curing agent included in the binder resin layer A includes 5-(2,5-dioxotetrahydrofuryl)-3-methyl-3-cyclohexene-1,2-di carboxylic anhydride expressed by a formula 2:

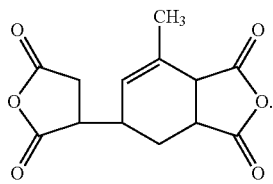

formula 2

12. An insulating coil obtained by winding a dry mica tape having a base material, a binder resin layer A formed on the base material and including an epoxy resin, a mica paper layer formed in contact with the binder resin layer A, and a binder resin layer B formed in contact with the mica paper layer, including an epoxy resin, and providing a cured resin with a higher glass transition point than that of a cured resin of an impregnating varnish only by reacting with the impregnating varnish including an epoxy resin impregnated into a dry mica tape wound around a conductor around the conductor insulatingly sheathed and formed into a specified shape to make an insulation coil unit, and injecting an impregnating varnish including an epoxy resin to the insulation coil unit for curing.

13. The insulation coil according to claim 12, wherein the impregnating varnish does not include an accelerator, and wherein the binder resin layer A and the binder resin layer B include an accelerator.

14. A stator coil, wherein the insulation coil according to claim 12 is incorporated in an iron core slot, and the insulation coil is connected in an iron core outer end.

15. A rotating machine comprising a stator coil according to claim 14 and a rotor coil.

16. A stator coil obtained by winding a dry mica tape having a base material, a binder resin layer A formed on the base material and including an epoxy resin, a mica paper layer formed in contact with the binder resin layer A, and a binder resin layer B formed in contact with the mica paper layer, including an epoxy resin, and providing a cured resin with a higher glass transition point than that of a cured resin of an impregnating varnish only by reacting with the impregnating varnish including an epoxy resin impregnated into a dry mica tape wound around a conductor around the conductor insulatingly sheathed and formed into a specified shape to make an insulation coil unit, incorporating the insulation coil unit to an iron core slot, connecting the insulation coil unit in an iron core outer end and integrating the insulation coil unit and an iron core to make a stator coil unit, and injecting an impregnating varnish including an epoxy resin to the stator coil unit for curing.

17. The stator coil according to claim 16, wherein the impregnating varnish does not include an accelerator, and wherein the binder resin layer A and the binder resin layer B include an accelerator.

* * * * *